United States Patent [19]
Pridonoff et al.

[11] Patent Number: 5,605,710
[45] Date of Patent: Feb. 25, 1997

[54] SINGLE CUP DISPOSABLE COFFEE BREWING DEVICE

[75] Inventors: Carl Pridonoff, Los Angeles; Kenneth Tarlow, Corte Madera, both of Calif.

[73] Assignee: Marathon Partners, Los Angeles, Calif.

[21] Appl. No.: 254,113

[22] Filed: Jun. 6, 1994

[51] Int. Cl.$^6$ ............................................. A47J 31/10
[52] U.S. Cl. ........................ 426/86; 426/77; 426/78; 426/82; 426/112; 426/115; 99/295; 99/306; 219/689; 210/474; 210/481; 220/202; 220/367.1; 206/0.5; 222/54; 222/460
[58] Field of Search .................. 426/77, 78, 79, 426/82, 234, 241, 243, 433, 115, 86, 112; 99/306, 295, 317, DIG. 10, DIG. 14, 299, 298, 316, 321, 322; 219/689; 210/474, 282, 291, 314, 478, 481, 482; 220/367, 202, 201; 206/0.5; 222/54, 460

[56] References Cited

U.S. PATENT DOCUMENTS

| | | | |
|---|---|---|---|
| 2,743,664 | 5/1956 | Dale | 99/295 |
| 2,822,273 | 2/1958 | Anderson | 99/295 |
| 2,835,191 | 5/1958 | Clurman | 210/474 X |
| 3,063,359 | 11/1962 | Bront | 99/306 X |
| 3,292,527 | 12/1966 | Stasse | 426/112 X |
| 3,334,574 | 8/1967 | Douglas | 210/474 X |
| 3,344,734 | 10/1967 | Aguirre-Batres et al. | 426/77 X |
| 3,589,272 | 6/1971 | Bouladon et al. | 426/112 X |
| 3,615,708 | 10/1971 | Abile-Gal | 210/474 X |
| 3,617,311 | 11/1971 | Beltle et al. | 426/86 |
| 3,971,305 | 7/1976 | Daswick | 426/77 X |
| 4,560,475 | 12/1985 | Kataoka | 210/474 X |
| 4,577,080 | 3/1986 | Grossman | 426/241 X |
| 4,697,503 | 10/1987 | Okabe et al. | 99/306 |
| 4,715,271 | 12/1987 | Kitagawa | 99/306 |
| 4,863,601 | 9/1989 | Wittekind et al. | 210/474 |
| 4,867,880 | 9/1989 | Pelle et al. | 210/474 |
| 4,867,993 | 9/1989 | Nordskog | 426/77 |
| 4,908,222 | 3/1990 | Yu | 426/241 |
| 4,948,601 | 8/1990 | Serbu | 426/82 |
| 4,981,588 | 1/1991 | Poulallion | 210/474 |
| 4,986,172 | 1/1991 | Hunnicutt, Jr. | 99/306 |
| 4,996,066 | 2/1991 | Love et al. | 426/77 |
| 5,010,221 | 4/1991 | Grossman et al. | 219/10.55 E |
| 5,055,311 | 10/1991 | Brauer, Jr. et al. | 426/82 |
| 5,059,325 | 10/1991 | Iida | 210/474 |
| 5,064,980 | 11/1991 | Grossman et al. | 219/10.55 E |
| 5,082,676 | 1/1992 | Love et al. | 426/79 |
| 5,095,185 | 3/1992 | Fuchs, Jr. | 219/10.55 E |
| 5,132,124 | 7/1992 | Tamaki et al. | 426/82 |
| 5,168,140 | 12/1992 | Welker | 219/10.55 E |
| 5,243,164 | 9/1993 | Erickson et al. | 426/77 X |

FOREIGN PATENT DOCUMENTS

| | | | |
|---|---|---|---|
| 2725854 | 4/1978 | Germany | 99/306 |
| 1947146 | 12/1991 | Germany | 426/77 |
| 5039822 | 11/1975 | Japan | 426/82 |
| 7710721 | 2/1979 | Sweden | 426/77 |
| 9110390 | 7/1991 | WIPO | 426/82 |

*Primary Examiner*—Milton Cano
*Attorney, Agent, or Firm*—Poms, Smith, Lande & Rose Professional Corporation

[57] ABSTRACT

A single cup disposable coffee brewing device foldable from a generally flat position to an unfolded position. The device has a coffee filter on the interior and a cardboard main body portion on the exterior and can be placed on top of a cup or mug. Coffee grounds are disposed in the filter and hot or cold water is poured into the unfolded device. The main body portion has a hole at bottom normally closed by a sealing element which dissolves after a predetermined period of time and allows brewed coffee to drip out into the mug or cup.

9 Claims, 2 Drawing Sheets

SINGLE CUP DISPOSABLE COFFEE BREWING DEVICE

BACKGROUND OF THE INVENTION

1. Field of the Invention

The invention relates to coffee brewing devices; and, more particularly, to a foldable single cup disposable coffee brewing device adapted to be placed on top of a coffee cup or mug.

2. Description of the Prior Art

Various types of coffee brewing devices are well known in the art. Various types of coffee filters are known in the art. In U.S. Pat. No. 4,863,601, to Wittekind, et al., one such exemplary filter is disclosed for use with a single cup. In this patent, a rather expensive filter is used to filter the brewed coffee. In U.S. Pat. No. 5,095,185 to Fuchs, a single cup coffee brewing device is disclosed having a valve on the filter body to control the flow of brewed coffee. This valve is temperature controlled but is a bimetallic strip that might give a metallic taste to the brewed coffee and is expensive to manufacture and install. Other suitable device are disclosed in U.S. Pat. Nos. 4,948,601; 5,132,124; 5,055,311; 4,981,588; 5,168,140; 5,059,325; 5,064,980; 4,908,222; 4,697,503; 4,867,880; 4,986,172; 4,996,066; 5,082,676; and 5,010,221. Except for the last two prior art patents, none of these remaining patents shows an element associated with the filter that dissolves when the water in the reservoir reaches a desirable brewing temperature and/or has been retained therein for a desirable brewing time. The 5,010,221 patent to Grossman, et al. does have a non-toxic heat responsive sealing substance adapted to releasably seal a partition in a closed position. However, the filter body is not foldable and the partition must be made to specific dimensions, then sealed in position by beeswax or the like. In U.S. Pat. No. 5,064,980 to Grossman, et al., a similar sealed partition is disclosed in a non-foldable filter container. Further, the beeswax melts almost immediately and thus does not retain the hot water in contact with the coffee grounds for a sufficient period of time. Applicant's device obtains a richer cup of coffee with less coffee grounds than Grossman, et al. might require.

There thus exists a need for a single cup disposable and foldable coffee brewing device which can hold heated water in contact with coffee grounds in the filter, then brew the same into a cup or mug.

SUMMARY OF THE INVENTION

It is an object of this invention to provide an improved single cup disposable coffee brewing device.

It is a further object of this invention to provide such a brewing device which maintains hot water in contact with coffee grounds in the filter for a predetermined brewing time.

These and other objects are preferably accomplished by providing a single cup disposable coffee brewing device foldable from a generally flat position to an unfolded position. The device has a coffee filter with coffee grounds sealed therein on the interior and a cardboard main body portion on the exterior and can be placed on top of a cup or mug. Hot water or cold water to be boiled in a microwave is poured therein. The main body portion has a hole at bottom normally closed by a sealing element which dissolves after a predetermined period of time when contacted with the hot water and allows brewed coffee to drip out into the mug or cup.

DESCRIPTION OF THE PREFERRED EMBODIMENT

Figure 1:
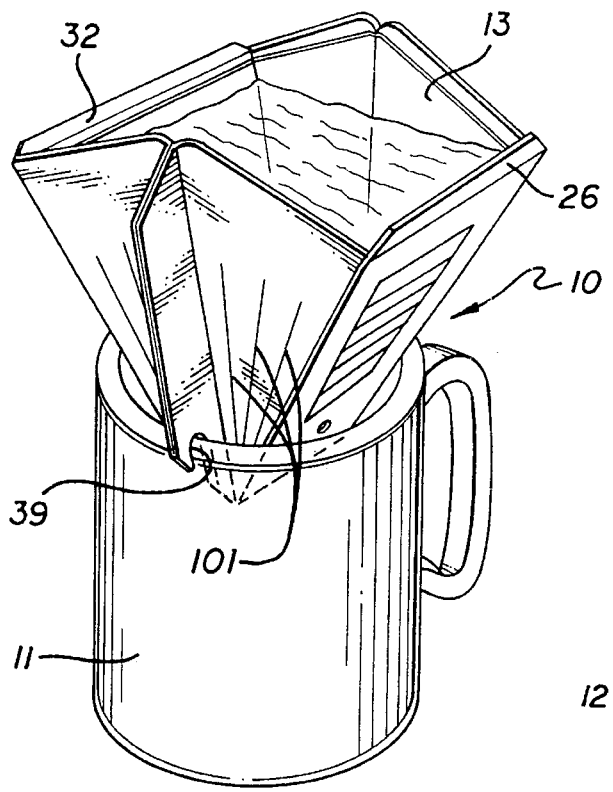
FIG. 1 is a perspective view of the single cup disposable coffee brewing device mounted on a conventional mug or cup in accordance with the teachings of the invention.
Figure 2:
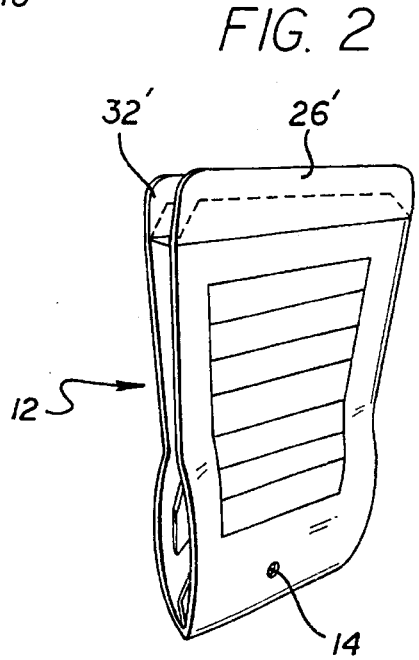
FIG. 2 is a perspective view of the device alone shown in folded condition.

Referring now to FIG. 1 of the drawing, a single cup disposable coffee brewing device 10 is shown mounted on top of a conventional single serving coffee cup or mug 11. Device 10 is shown in folded condition in FIG. 2.

Figure 3:
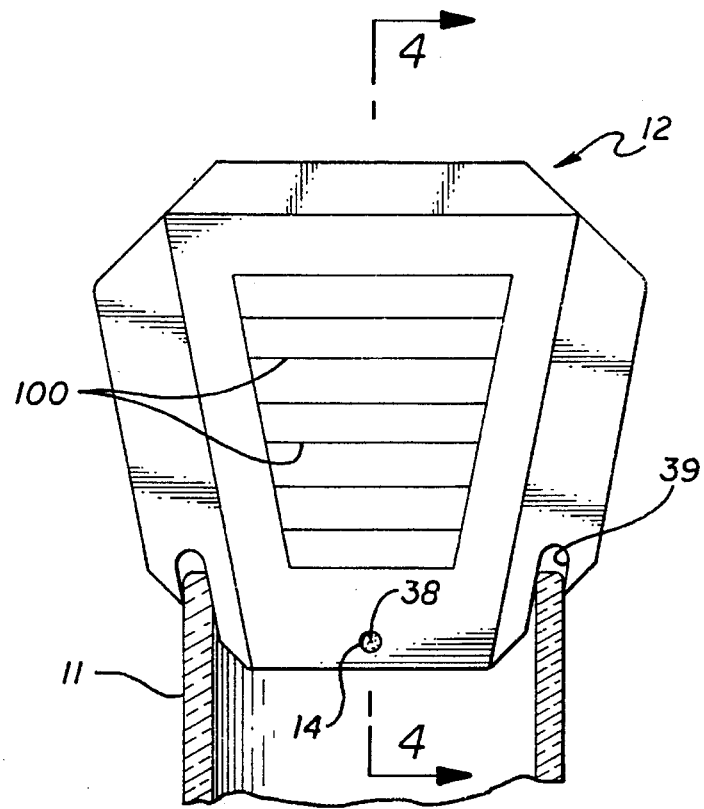
FIG. 3 is an elevational view, partly in section, of the device mounted on the cup or mug of FIG. 1.
Figure 6:
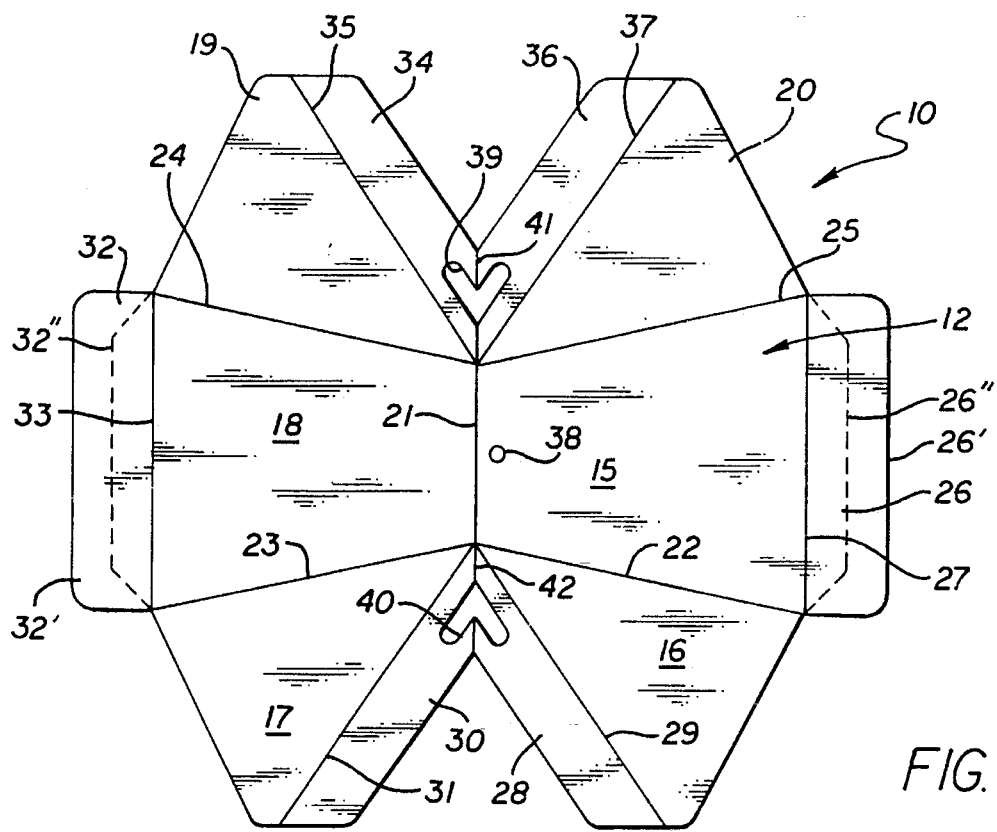
FIG. 6 is a plan view, partly in section, of the device of FIG. 1 in an open unfolded and unsealed position, the filter being omitted therefrom.

As seen in FIG. 6, device 10, shown in open, unfolded and unsealed position, the filter not being shown, is comprised of an outer main body portion 12, and a valve 14 (seen best in FIG. 3). Main body portion 12 is preferably made of a relatively stiff shape-retaining material, such as cardboard or chipboard, and is comprised of interconnected main sections, such as the six sections 15 through 20, shown in FIG. 6. Sections 15 and 18 may be in the form of generally truncated trapezoidal configurations connected at fold line 21. Sections 16, 17, 19, and 20 may be generally triangular in configuration. Section 16 is thus joined to section 15 at fold line 22; section 17 is joined to section 18 at fold line 23; section 19 is joined to section 18 at fold line 24; section 20 is joined to section 15 at fold line 25.

Section 15 has an outer tab 26 connected thereby by fold line 27. A tear-off tab portion 26' is connected to tab 26 along perforated line 26". Section 16 has a side tab 28 connected thereto at fold line 29. Section 17 also has a side tab 30 connected thereto at fold line 31 (tabs 30, 28 making a V, as shown, in the unfolded position). Section 18 also has an outer tab 32 connected thereto by fold line 33 with an outer tear-off tab portion 32' connected thereto along perforated line 32". Section 19 has a side tab 34 connected thereto at fold line 35; and section 20 has a side tab 36 connected thereto at fold line 37 (tabs 34, 36 making a V, as shown, in the unfolded position).

A hole 38 is provided through one of the sections, such as section 15, adjacent fold line 21 and spaced therefrom.

Figure 5:
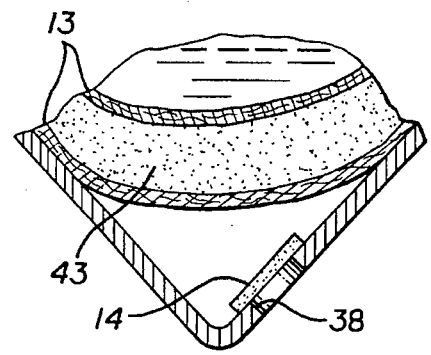
FIG. 5 is a view taken along line 5 of FIG. 4.

As seen in FIG. 5, this hole 38 is covered by a heat and time dissolvable element 14, as will be discussed. Also, as seen in FIG. 6, V-shaped cut-outs 39, 40 are provided at the junction of tabs 34, 36 and tabs 28, 30, respectively (at respective fold lines 41, 42).

Figure 4:
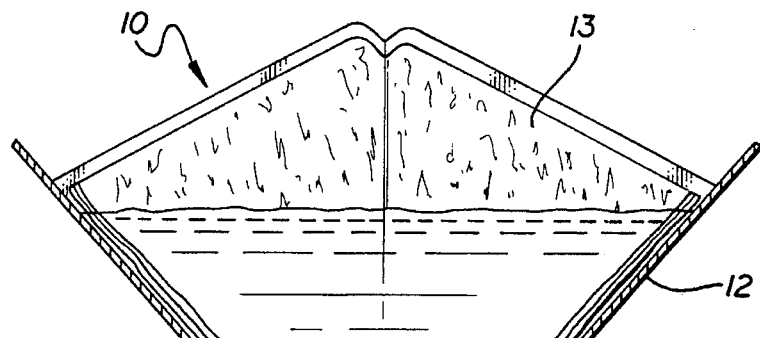
FIG. 4 is a view taken along lines 4—4 of FIG. 3.

Coffee filter 13 is a sealed envelope of filter material containing therein ground coffee 43 (FIG. 5). Filter 13 is generally the configuration of main body portion 12 when in the unfolded condition shown in FIG. 6 or at least generally conforms to the interior thereof when placed internally as seen in FIG. 4. In assembling the elements 12, 13 and 14, element 14 (FIG. 5) is installed below what would be the bottom of the filter 13, when placed in position, and in the main body portion 12. Then the main body portion 12, with element 14 in place, is folded about fold line 21 until flanges or tabs 34, 36, tabs 30, 28 and tabs 26, 32 abut against each other. Tabs 34, 36 and tabs 28, 29 are secured together, as by heat sealing or ultrasonic welding. Device 10 folds about fold lines 23, 31, 29, 22, 25, 37, 35, and 24. Filter 13 is placed inside of main body portion 12 and tabs 26, 26' are then folded over on top of tabs 32, 32' and heat sealed or sonically welded together which also heat seals the upper edges of filter 13 therein.

In operation, referring to FIG. 1, tabs 26, 26' are then opened by tearing off tear-off tab portions 26', 32' and device 10 is unfolded and placed on top of mug or cup 11, the rim thereof fitting into the V-shaped cut-outs 39, 40 formed in device 10. Either hot water of a predetermined temperature and measurement, e.g., 8 ounces, is poured into open device 10 in FIG. 1; or cold water may be used and microwaved. After a predetermined period of time in contact with the coffee grounds, the material of valve 14 dissolves and brewed coffee drips down into cup 11.

Thus, a single cup or mug of coffee from a single use, disposable coffee brewing device 10 which contains 100% ground coffee, is shown. The device 10 contains four parts: (1) a conical shaped filter holder in the form of main body portion 12; (2) filter 13; (3) a valve 14; and (4) the coffee grounds 43. The holder in the form of main body portion 12 contains a filter 13 in which the coffee grounds 43 are located. There is an opening 38 in the bottom of the holder in the form of main body portion 12 which contains the valve 14. The valve 14 will allow water to stay in holder in the form of main body portion 12 until the grounds 43 are fully soaked and the water is the proper temperature for brewing.

The holder, in the form of main body portion 12, may be sold in a folded condition and individually sealed, such as by foil wrap. To use, the holder in the form of main body portion 12 is unfolded and placed on top of a cup or mug. The V-shaped cut-outs 39, 40 in the side flanges are hooked over the side of the mug 11. Water is poured in. The water drains through the coffee grounds 43, the filter 13, hole 38 in the bottom of the holder in the form of main body portion 12 and into the cup 11 (after dissolution of valve 14).

The water can be heated in two ways: (1) water heated from another source (such as water boiled on a stove) can be poured into the device 10, or (2) cold water can be poured into the device 10. The mug 11 with the holder in the form of main body portion 12 on top thereof can be placed in a microwave for about 3 minutes. The valve 14 in the hole 38 at the bottom of the holder in the form of main body portion 12 will hold cold water until it reaches the proper temperature for brewing. When the water reaches the proper temperature, and soaks therein for a predetermined period of time, the valve 14 dissolves and the water drips through making a single cup of coffee.

Any suitable dimensions may be used. Side flanges 34, 36 and 29, 30 and hooks 39, 40 are designed to fit in a stable manner on a range of mug sizes from approximately 2¾" I.D. to 3¼" O.D. This encompasses the majority of mug sizes. The device 10 is designed primarily for mugs from 7 to 10 ounces in capacity. Fill lines, such as lines 100, FIG. 3, may be embossed or printed on the outside of the holder in the form of main body portion 12. The device 10 can be used to make from 7 ounces to 10 ounces of liquid coffee. Most mugs are in this size range. (Fill lines 100 will actually indicate 8 ounces to 11 ounces of water since approximately 1 ounce of water is soaked into the grounds). These fill lines, if embossed, also serve the function of providing rigidity to the side flanges 13, 15 when device 10 is filled with water. The tabs when folded inwardly, also serve to provide rigidity.

Any suitable materials may be used. For example, for the holder in the form of main body portion 12 point to 14 point SBS or FDS approved chip board, poly-coated (0.5 to 0.75 in. coating) on one side (inside) may be used. The overall size of the holder in the form of main body portion 12 may be about 9" by 9" as seen in plan view in FIG. 6, hole 38 being about 0.110 inches in diameter. The holder, in the form of main body portion 12, may be about 0.014 inches thick (±).

The holder, in the form of main body portion 12, may be manufactured from a standard die cut and scoring machinery. Holder 12 may be heat sealed or ultrasonically welded along the side flanges 34, 36 and 28, 30 and top flanges 32, 26. The fold lines are constructed to allow full compression from open position to a compact package. The way the side flanges 16, 17 and 19, 20 fold inwardly results in a space at the bottom of device 10 to accommodate the coffee grounds. The holder, in the form of main body portion 12, is designed to be heat sealed or sonically welded across the top flanges 26, 26', 32, 32' preventing spillage of coffee grounds. The top of the holder in the form of main body portion 12 may be perforated at fold lines 26", 32" so that it will hold the ground coffee when sealed but can be easily torn and opened.

Hole or slot 38 is cut into the holder in the form of main body portion 12 for the placement of the valve 14. The drain hole 38 is located approximately ¼th inch up from the bottom of the holder in the form of main body portion 12, allowing collection of drips in the holder in the form of main body portion 12 itself, rather than allowing them to drip out during disposal.

As seen in FIG. 1, vertical ribs 101 may be embossed into the holder in the form of main body portion 12 to provide lateral strength for the weight of the water therein and to hold the filter 13 away from the holder allowing drainage between the filter 13 and the holder in the form of main body portion 12. Indicia 100 may be in the form of horizontal ribs embossed therein for the same function.

Filter 13 may be made of conventional coffee brewing filter paper, heat sealable.

The side flanges on the filter 13 are heat-sealed or ultrasonically welded into the holder in the form of main body portion 12 during assembly. This allows the proper placement of the filter 13 in the holder in the form of main body portion 12, without requiring attachment on the top or bottom. The filter paper is approximately the same shape as the holder in the form of main body portion 12 and generally conforms to the shape of the holder in the form of main body portion 12.

The filter 13 is located in the holder in the form of main body portion 12 with an approximately ¼" gap up from the bottom of the holder in the form of main body portion 12. This allows complete drainage of the water through the coffee grounds without clogging in the bottom and without clogging the hole 38 in which the valve 14 is located.

The filter paper is shaped to conform generally with the holder in the form of main body portion 12 and "nest" inside the holder in the form of main body portion 12. The vertical ribs 101 on the holder in the form of main body portion 12 create a gap between the holder in the form of main body portion 12 and the filter 13 allowing the water to drain over the coffee grounds through the side of the filter 13 (as well as the bottom) of the device 10 and down the inside of the holder in the form of main body portion 12 to the drain hole 38.

The top of the filter 13 ends at the score lines 27, 33 near the top flanges 26, 26', 32, 32' of the holder in the form of main body portion 12. The top flanges 26, 26', 32 32' are heat sealed or ultrasonically welded together up to and including the score lines 26", 32". This allows complete sealing of the coffee grounds 43 in the filter 12 so that there is no spillage during shipping.

The holder in the form of main body portion 12 and filter 13 are designed so that the coffee is loose in the filter 13 after the holder in the form of main body portion 12 is opened. When filled with water, this allows the grounds to float freely in the filter 13, allowing maximum contact with the water, maximum absorption and more efficient extraction of the coffee soluble solids (i.e., the taste molecules) from the coffee grounds 43 into the water. (This is in contract to a "clump" of coffee in a cup, as for example, in a tea bag-like coffee bag which provides for a very inefficient extraction).

The exact type of filter paper for filter 13 and grind size of grounds 43 have been selected to slow the flow of water through the filter paper to provide for maximum extraction efficiency (i.e., the most coffee flavor) from the least amount of coffee. For example, coffee of a fine grind and about 14 grams may be used. The drain valve 14 is positioned over a hole 38 (or slot) located towards the bottom of the holder in the form of main body portion 12 (FIG. 5). The valve 14 has two purposes:

1. After cold water has been poured into the holder in the form of main body portion 12 and placed in a microwave, it holds the heated water until it reaches an appropriate temperature for brewing at approximately 140° to 180° fahrenheit, during the aforementioned holding period, valve 14 dissolves and brewed coffee drips out of the holder in the form of main body portion 12. This allows device 10 to be used with hot or cold water. To use with hot water, the water is heated from another source (for example, boiling on a stove or from an "instant hot" water dispenser and poured into the filter 13). As described below, the valve 14 will hold the water for another 30 seconds, then allow it to drain into the cup. Alternately, cold water can be poured into the holder in the form of main body portion 12 after the holder in the form of main body portion 12 is placed on mug 11. The mug 11 and holder in the form of main body portion 12 are then placed into the microwave for three minutes (±). In that period of time, the water heats to the optimum brewing temperature, the valve material melts and the hot water drips through the grounds into the mug 11.

2. To hold water, whether heated or not, for 30 to 45 seconds to allow complete soaking of the coffee grounds in hot water. This soaking or "wetting" dramatically increasing the efficiency of extraction ("richness of the coffee") as compared to brewing methods in which the grounds are soaked only momentarily and then water is poured over the grounds which immediately drip into a cup or pot.

Any suitable hot water dissolvable and edible material may be used for the material of valve 14. For example, FDA-approved gelatinous material (similar to the gel-cap type pills) may be used. The gel completely dissolves leaving no discernable taste, smell or change in appearance to the coffee.

Valve 14 may be in the shape of a self tapping plug which can be manually or machine inserted into the drain hole 38 or a thin sheet (e.g., about 0.025 inches in diameter) which can be heat sealed or otherwise applied over the drain hole 38. A 0.025–0.040 inch diameter film may be applied in liquid form, then rolled to the desired thickness, then dried. The exact shape and method of applying the valve 14 will be determined based upon ease of manufacture.

It can be seen that there is disclosed a single cup disposable coffee brewing device. Although a specific embodiment of the invention has been disclosed, variations thereof may occur to an artisan and the scope of the invention is only to be determined by the scope of the appended claims.

We claim:

1. A single cup disposable coffee brewing device comprising an outer housing of a relatively stiff foldable material foldable from a first folded unopened position to a second open unfolded position and having an interior and an exterior thereby forming a conically shaped holder adapted to extend into a cup when set on top thereof;

a filter secured in the interior of said housing having coffee grounds of a predetermined grind and of a predetermined measurement disposed therein, said filter having comprised of a filter paper adapted to pass water therethrough;

an opening below said filter of a predetermined size disposed in said holder communicating the interior of said holder with the exterior thereof; and valve means of a hot water dissolvable non-toxic gelatinous material for closing off said opening and adapted to dissolve after a predetermined period of time when contacted by water of a predetermined temperature, said time period being sufficient to cause brewing of coffee grounds in said housing prior to dissolving of said valve.

2. In the device of claim 1 wherein said holder having a pair of spaced V-shaped cut-outs on opposite sides of said holder adjacent the bottom thereof for cooperating with the rim of a cup or mug.

3. In the device of claim 1 wherein the holder is made of chipboard.

4. In the device of claim 1 wherein the interior of said holder has a capacity of about at least about 7 to 11 fluid ounces.

5. In the device of claim 1 wherein the outer configuration of said housing in its unfolded state is generally conical.

6. In the device of claim 1 wherein said filter is heat sealed in position in said holder.

7. In the device of claim 1 wherein said opening is about ¼ above the bottom of said holder and about 0.110 inches in diameter.

8. In the device of claim 1 wherein said holder is formed from a planar blank about 9"×9" in overall dimensions.

9. A single cup disposable coffee brewing device comprising an outer housing of a relatively stiff foldable material foldable from a first folded unopened position to a second open unfolded position and having an interior and an exterior thereby forming a holder;

a filter secured in the interior of said housing having coffee grounds of a predetermined grind and of a predetermined measurement disposed therein, said filter being comprised of a filter paper adapted to pass water therethrough;

an opening below said filter of a predetermined size disposed in said holder communicating the interior of Said holder with the exterior thereof; and valve means of water dissolvable material for closing off said opening and adapted to dissolve after a predetermined period of time when contacted by water of a predetermined temperature, said holder having a first generally trapezoidally shaped section joined by a fold line at its base to a like configured second generally trapezoidally shaped section, a first generally triangularly shaped section joined along one side thereof by a fold line to a first side of said first generally trapezoidally shaped section, said first generally triangularly shaped section being joined by a fold line to a first tab extending along the other side of said first generally triangularly shaped section, a second generally triangularly shaped section joined along one side thereof by a fold line to a first side of said second trapezoidally shaped section, the other side of said second generally triangularly shaped section being joined by a fold line to a second tab extending along the other side of said second generally triangularly shaped section, a third generally triangularly shaped section joined along one side thereof by a fold line to a second side of said first generally trapezoidally shaped section, said third generally triangularly shaped section being joined by a fold line to a third tab extending along the other side of said third generally triangularly shaped section, a fourth generally triangularly shaped section joined along one side thereof by a fold line to a second side of said second trapezoidally shaped section, the other side of said fourth generally triangularly shaped section being joined by a fold line to a fourth tab extending along the other side of said fourth generally triangularly shaped section, a fifth tab joined by a fold line to the base of said first trapezoidally shaped section, and a sixth tab joined by a fold line to the base of said second trapezoidally shaped section, and a first generally V-shaped cut-out through said holder along a fold line interconnecting said first tab to said second tab, and a second generally V-shaped cut-out through said holder along a fold line interconnecting third tab to said fourth tab.

* * * * *